United States Patent
Seuss

(10) Patent No.: US 7,877,344 B2
(45) Date of Patent: Jan. 25, 2011

(54) METHOD AND APPARATUS FOR EXTRACTING MEANING FROM DOCUMENTS USING A MEANING TAXONOMY COMPRISING SYNTACTIC STRUCTURES

(75) Inventor: Charles D. Seuss, Charlestown, MA (US)

(73) Assignee: Northern Light Group, LLC, Cambridge, MA (US)

( * ) Notice: Subject to any disclaimer, the term of this patent is extended or adjusted under 35 U.S.C. 154(b) by 707 days.

(21) Appl. No.: 11/870,201

(22) Filed: Oct. 10, 2007

(65) Prior Publication Data

US 2009/0099993 A1    Apr. 16, 2009

(51) Int. Cl.
*G06F 17/00* (2006.01)
*G06N 5/02* (2006.01)

(52) U.S. Cl. .................................................. 706/47
(58) Field of Classification Search ............. 706/47
See application file for complete search history.

(56) References Cited

U.S. PATENT DOCUMENTS

| | | | |
|---|---|---|---|
| 5,924,090 A | 7/1999 | Krellenstein | |
| 6,134,553 A | 10/2000 | Jacobson et al. | |
| 6,295,529 B1 | 9/2001 | Corston-Oliver et al. | |
| 6,549,897 B1 | 4/2003 | Katariya et al. | |
| 6,606,620 B1 | 8/2003 | Sundaresan et al. | |
| 6,789,230 B2 | 9/2004 | Katariya et al. | |
| 6,901,399 B1 * | 5/2005 | Corston et al. | 1/1 |
| 6,901,402 B1 | 5/2005 | Corston-Oliver et al. | |
| 7,139,752 B2 | 11/2006 | Broder et al. | |
| 7,146,361 B2 | 12/2006 | Broder et al. | |
| 7,188,106 B2 | 3/2007 | Dwork et al. | |
| 7,269,594 B2 | 9/2007 | Corston-Oliver et al. | |
| 2008/0021925 A1 * | 1/2008 | Sweeney | 707/104.1 |

* cited by examiner

*Primary Examiner*—Michael B. Holmes
*Assistant Examiner*—Li-Wu Chang
(74) *Attorney, Agent, or Firm*—Lando & Anastasi, LLP

(57) ABSTRACT

Systems and methods are provided for an expert search engine. In one embodiment, a method may employ a computer based system to define a meaning taxonomy including one or more meaning loaded entities, associate documents to the meaning taxonomy based on a set of expert rules and the syntactic structures included in the documents and provide the results to a user. In another embodiment, a system includes interfaces for meaning taxonomy, expert rule and search criteria information. The information provided by these interfaces is then used to determine how a set of documents maps to meaning taxonomy to assist the user in locating documents that are most interesting from a meaning perspective and to provide a user with an interface to navigate the meaning taxonomy as it applies to the set of documents.

15 Claims, 11 Drawing Sheets

Figure 5

METHOD AND APPARATUS FOR EXTRACTING MEANING FROM DOCUMENTS USING A MEANING TAXONOMY COMPRISING SYNTACTIC STRUCTURES

BACKGROUND

1. Field of Invention

Aspects of the present invention relate to content analysis, and more specifically, to systems and methods for automated analysis of content.

2. Discussion of the Related Art

Most currently available search engines follow a similar approach to presenting users with documents that may be of interest. For instance, when presented with new documents to make available for searching, conventional search engines typically scan the documents for key terms and build an index to the documents using those terms. Then, when presented with search criteria from a user, conventional search engines will often scan the search criteria for key terms and, using the index, identify one or more documents including those key terms. Next, these documents are usually presented to the user, often ranked in some fashion. The most common basis for ranking is relevancy, which is often computed using, among other factors, the number of times search criteria keywords are found in document content and metadata.

When presenting search criteria to a search engine, users typically iterate through a series of search criteria, and, as part of each iteration, assess the quality of the results achieved. Additionally, users may try several different search engines, because idiosyncrasies in the index building process employed by different search engines often yield different search results.

SUMMARY OF INVENTION

Embodiments of the present invention provide a search engine that overcomes or alleviates one or more of the problems of conventional search engines and that may provide more meaningful results than do conventional search engines. For instance, conventional search engines may require a user to read documents listed in a search result to determine which ones contain content relative to his research task.

In broad overview, one aspect of the present invention relates to a search engine that analyzes a body of content and extracts complex meaning from the body of content such that users may quickly ascertain documents of interest. The search engine in accord with the invention uses software and hardware to facilitate the creation of a meaning taxonomy, define syntactic structures and expert rules related to meaning loaded entities within taxonomy, and associate analyzed content with the meaning loaded entities to enable users to access the analyzed content by navigating the meaning taxonomy.

One aspect of the invention is directed toward a computer-implemented method for extracting meaning from a plurality of documents that includes identifying a meaning taxonomy that includes a plurality of concepts, identifying a group of syntactic structures that include at least one syntactic structure, associating at least one of the group of syntactic structures with at least one of the plurality of concepts, and associating at least one of the plurality of documents with at least one of the plurality of concepts based a relationship between the at least one of the plurality of documents and at least one of the group of syntactic structures.

In the method, identifying the meaning taxonomy may include identifying a plurality of meaning loaded entities. In the method, identifying a group of syntactic structures may include identifying a word. In the method, identifying a group of syntactic structures may include identifying a phrase. In the method, identifying a group of syntactic structures may include identifying a sentence. In the method, associating the at least one of the group of syntactic structures may include associating a plurality of the group of syntactic structures with at least one of the plurality of concepts. In the method, associating the at least one of the group of syntactic structures may include associating a plurality of the group of syntactic structures in a relative proximity to each other with at least one of the plurality of concepts.

In the method, associating the at least one of the plurality of documents may include associating the at least one of the plurality of documents with the at least one of the plurality of concepts, and the at least one of the plurality of documents may include at least one of the group of syntactic structures that is associated with the at least one of the plurality of concepts. In the method, associating the at least one of the plurality of documents may include associating the at least one of the plurality of documents with the at least one of the plurality of concepts, and the at least one of the plurality of documents may include none of the group of syntactic structures that is associated with the at least one of the plurality of concepts.

In the method, associating at least one of the group of syntactic structures with at least one of the plurality of concepts may include associating at least one normalized syntactic structure with at least one of the plurality of concepts and associating at least one non-normalized syntactic structure with the at least one normalized syntactic structure, wherein associating at least one of the plurality of documents comprises associating at least one of the plurality of documents with at least one of the plurality of concepts based a relationship between the at least one of the plurality of documents and at least one non-normalized syntactic structure of the group of syntactic structures.

The method may also include executing a search against the plurality of documents, the search resulting in a subset of the plurality of documents and providing the subset of the plurality of documents to an external entity, the subset of the plurality of documents grouped by at least one concept of the plurality of concepts that is associated with at least one of the subset of the plurality of documents.

Another aspect of the present invention is directed toward a computer readable medium having computer readable signals stored thereon that define instructions that, as a result of being executed by a computer, instruct the computer to perform a method for extracting meaning from a plurality of documents that includes identifying a meaning taxonomy that includes a plurality of concepts, identifying a group of syntactic structures that include at least one syntactic structure, associating at least one of the group of syntactic structures with at least one of the plurality of concepts and associating at least one of the plurality of documents with at least one of the plurality of concepts based a relationship between the at least one of the plurality of documents and at least one of the group of syntactic structures.

Another aspect of the present invention is directed toward a computer-implemented method for providing analysis to a user of a computer system, the computer system having a display, the method including providing, to the user in the display of the computer system, a first result of executing a first search, the first result including a plurality of documents; providing, to the user in the display, an input component that allows the user to provide at least one meaning loaded entity; receiving, in the display, the at least one meaning loaded entity provided by the user and providing, to the user in the display, a second result of executing a second search, the second search executed against the plurality of documents and using the at least one meaning loaded entity. The second result may be grouped by the at least one meaning loaded entity.

In the method, providing, to the user in the display, the input component that allows the user to provide at least one meaning loaded entity may include providing, to the user in the display, an input component that allows the user to provide at least one business related meaning loaded entity.

Another aspect of the present invention is directed toward a computer-implemented method for configuring a meaning taxonomy, the method including providing, to the user in the display, an input component that allows the user to provide at least one non-normalized syntactic structure; receiving, in the display, the at least one non-normalized syntactic structure; providing, to the user in the display, an input component that allows the user to associate the at least one non-normalized syntactic structure with at least one meaning loaded entity and receiving, in the display, the association between the at least one non-normalized syntactic structure and the at least one meaning loaded entity.

In the method, providing, to the user in the display, an input component that allows the user to provide at least one non-normalized syntactic structure may include providing, to the user in the display, an input component that allows the user to enter a word. In the method, providing, to the user in the display, an input component that allows the user to provide at least one non-normalized syntactic structure may include providing, to the user in the display, an input component that allows the user to enter a phrase. In the method, providing, to the user in the display, an input component that allows the user to provide at least one non-normalized syntactic structure comprises providing, to the user in the display, an input component that allows the user to enter a sentence.

The method may also include providing, to the user in the display, an input component that allows the user to provide at least one meaning taxonomy element; receiving, in the display, the at least one meaning taxonomy element; providing, to the user in the display, an input component that allows the user to associate the at least one meaning taxonomy element with the at least one meaning loaded entity and receiving, in the display, the association between the at least one meaning taxonomy element and the at least one meaning loaded entity.

Another aspect of the present invention is directed toward a computer readable medium having computer readable signals stored thereon that define instructions that, as a result of being executed by a computer, instruct the computer to perform a method for extracting meaning from a plurality of documents, the method including providing, to the user in the display of the computer system, a first result of executing a first search, the first result including a plurality of documents; providing, to the user in the display, an input component that allows the user to provide at least one meaning loaded entity; receiving, in the display, the at least one meaning loaded entity provided by the user and providing, to the user in the display, a second result of executing a second search, the second search executed against the plurality of documents and using the at least one meaning loaded entity. The second result may be grouped by the at least one meaning loaded entity.

Another aspect of the present invention is directed toward a system for building associations between a meaning taxonomy and at least one document that includes a first input configured to receive the at least one document from another system, the at least one document including syntactic structures, a second input configured to receive a meaning taxonomy including a plurality of concepts, a third input configured to receive a set of expert rules, a memory with storage capacity, and a controller coupled to the memory and the first, second and third inputs and configured to store an association of the at least one document with the meaning taxonomy based on the syntactic structures included in the document, the concepts in the meaning taxonomy and the set of expert rules.

In the system, the plurality of concepts may include a plurality of meaning loaded entities. In the system, the set of expert rules may include a set of logical propositions that are expressed in terms of meaning loaded entities. In the system, the controller may be further configured to store the association of the at least one document with a concept within the meaning taxonomy, and the concept may be associated with a non-normalized syntactic structure that is included in the at least one document. In the system, controller may be further configured to store the association of the at least one document with a meaning loaded entity within the meaning taxonomy, and the meaning loaded entity may be associated with an expert rule that includes a logical proposition that evaluates to true when evaluated against the at least one document.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is an example user interface according to one embodiment of the present invention that may be presented by an expert search engine system to provide search results to a user;

DETAILED DESCRIPTION

Figure 1:
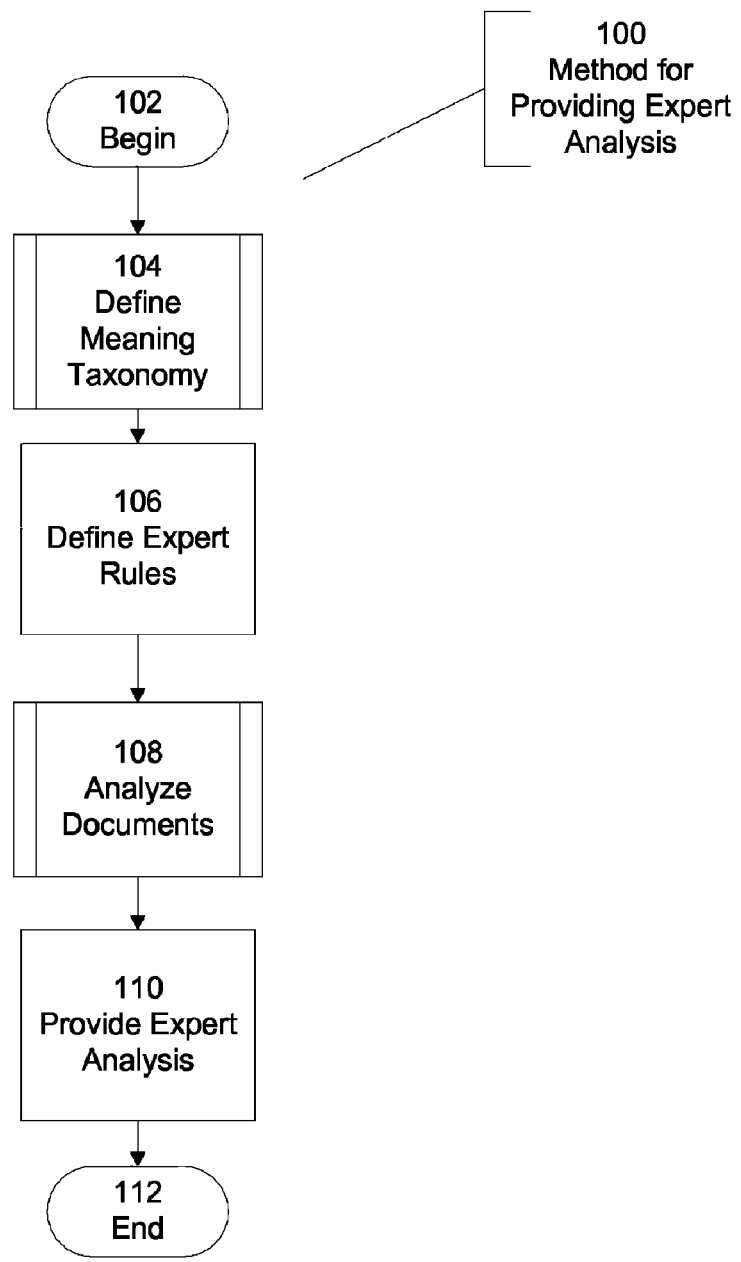
FIG. 1 is a flow chart of a process for providing expert analysis according to one embodiment of the present invention.

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

At least one embodiment of the present invention relates to systems and methods for automated extraction of meaning from bodies of content. These bodies of content may include substantially discrete bodies of content such as documents. These documents, in turn, may be made up of various syntactic structures that embody semantic meaning. Syntactic structures may include any set of symbols from which semantic meaning may be interpreted. A non-limiting list of example syntactic structures includes characters, words, phrases, clauses, sentences, paragraphs and pages. The semantic meaning of one or more syntactic structures may depend not only on the symbols included in the syntactic structure, but also on the context of the syntactic structure, e.g. its relationship to other syntactic structures.

Additionally, aspects and embodiments of the present invention may be directed toward specific information subject areas, or domains. Information domains may include substantially discrete areas of knowledge that may express concepts using specialized terminology, or jargon. A non-limiting list of example information domains includes the engineering and scientific disciplines, law, medicine and business management. As will be discussed in further detail below, an information domain may include one or more meaning taxonomies.

One embodiment of the present invention is a method for providing expert analysis to a user of a search engine. A high level procedural flow of this method is shown in FIG. 1 and may include an information domain expert defining a meaning taxonomy 104 and expert rule set 106 to encode his expertise into a system. The system may then apply this encoded knowledge by analyzing documents 108 and presenting the results of the expert analysis 110 to the user of the search engine. Components of this process and its sub-processes may be implemented using, for example, a general-purpose computer system as discussed with regard to FIG. 9 below.

More particularly, at block 102, process 100 begins. At block 104 an information domain expert may define one or more meaning taxonomies. For instance, the information domain expert may be any person who can perform expert analysis of subject matter within the information domain. The meaning taxonomy may serve as the basis for an analytical framework in accordance with one embodiment of the present invention. The meaning taxonomy may include key, often complex and/or specialized, concepts related to the information domain being addressed. As referred to herein, these key concepts may also be termed meaning loaded entities. The meaning taxonomy may define various non-normalized syntactic structures that when present in a document may indicate the document may be relevant to a meaning loaded entity. Further, the meaning taxonomy may identify various syntactic structures that may be used to normalize the non-normalized syntactic structures. Both the normalized and non-normalized syntactic structures may be associated with meaning loaded entities.

The meaning taxonomy may include multiple layers of syntactic structures and associated meaning loaded entities arranged in various ways. For example, in one embodiment, these layers may be hierarchical in nature. Further, the meaning loaded entities may be positioned at various locations within the meaning taxonomy. The specific configuration of any meaning taxonomy will depend upon the information domain being analyzed and the meaning loaded entities that the information domain expert wishes to use for automatic, repeatable expert analysis and/or categorization. The flexible form and substance of the meaning taxonomy enables an expert to encode his categorical knowledge into the system in the manner most beneficial for application of an expert rule set, which will be discussed further below.

Figure 2:
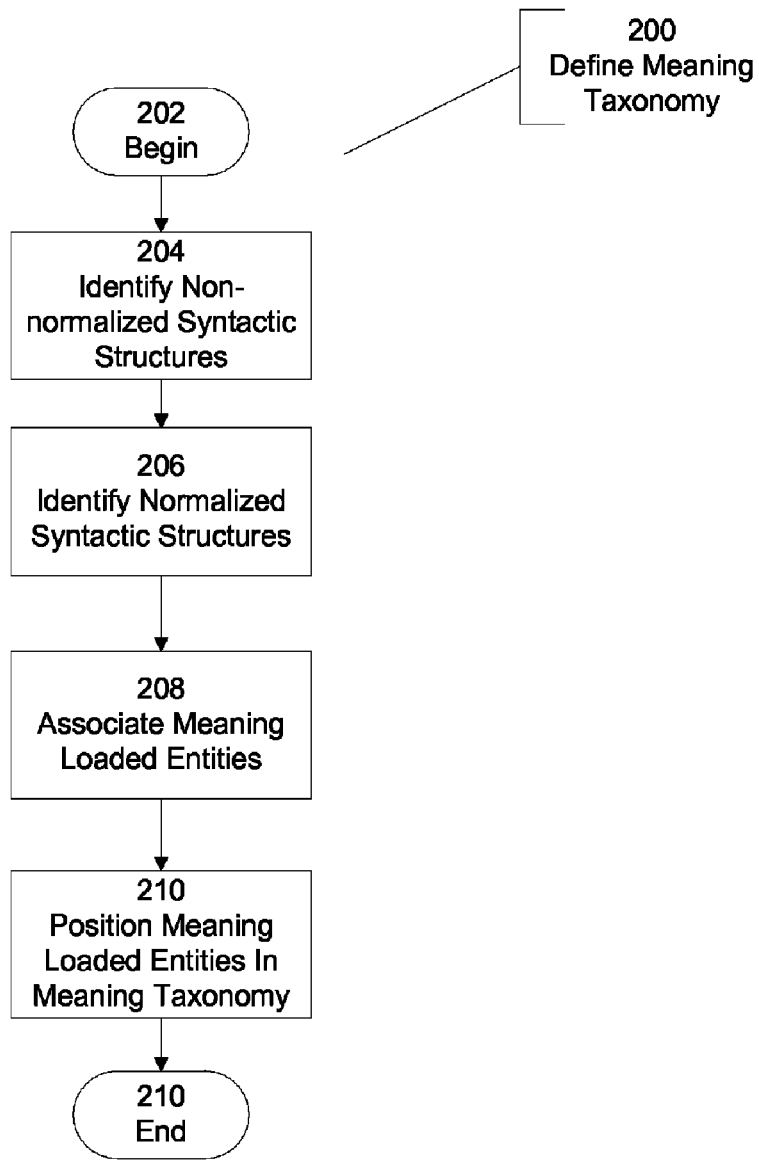
FIG. 2 is a flow chart of a process for defining a meaning taxonomy according to one embodiment of the present invention.

FIG. 2 illustrates an exemplary process for defining a meaning taxonomy having three tiers. At block 202, process 200 begins. At block 204, the information domain expert includes one or more non-normalized syntactic structures in the meaning taxonomy. These non-normalized syntactic structures may serve as the basis for processing documents during document analysis. At block 206, the information domain expert may identify one or more normalized syntactic structures and associate the one or more normalized syntactic structures with the non-normalized syntactic structures. A normalized syntactic structure may be used to standardize non-normalized syntactic structures into a standardize nomenclature.

At block 208, the information domain expert associates one or more meaning loaded entities with the normalized and/or non-normalized syntactic structures. As discussed above, a meaning loaded entity is may be characterized as a foundational concept within the information domain that may be used by experts to perform analysis within the information domain.

At block 210, the various meaning loaded entities are positioned within the meaning taxonomy. The elements of the meaning taxonomy may be arranged into any interconnect graph structure. In one embodiment, for example, the meaning taxonomy may take the form of a hierarchical tree with meaning loaded entities being positioned as leaf nodes within the tree structure.

At block 212, process 200 ends.

Although the embodiment illustrated in FIG. 2 includes three tiers, any number of tiers may be used without departing from the spirit of the present invention. For example, in one embodiment, meaning loaded entities may be associated with other meaning loaded entities in a flat and/or hierarchical fashion. In another embodiment, non-normalized syntactic structures may be associated directly with meaning loaded entities in a parent-child relationship. Thus, the logical structure of the meaning taxonomy may be tailored according to the characteristics of the information domain, thereby increasing the ease of creating and maintaining the meaning taxonomy.

Table 1 shows an example meaning taxonomy that is focused in the area of business management.

TABLE 1

| Non-normalized Syntactic Structure | Meaning Loaded Entity | Position in Meaning Taxonomy |
| --- | --- | --- |
| announced a partnership | Business Partnerships | Business Partnerships |
| business partners | Business Partnerships | Business Partnerships |
| Formed a partnership with | Business Partnerships | Business Partnerships |
| channel partners | Channel Partnerships | Business Partnerships |
| development partners | Development Partnerships | Business Partnerships |
| distribution partners | Distribution Partnerships | Business Partnerships |
| financial partners | Financial Partnerships | Business Partnerships |
| marketing partners | Marketing Partnerships | Business Partnerships |
| strategic partners | Strategic Partnerships | Business Partnerships |
| Cash cow | Cash Cow | Corporate Strategy |
| Close follower | Close Follower | Corporate Strategy |
| ahead of the market | Innovation | Corporate Strategy |
| defining the future | Innovation | Corporate Strategy |
| defining the platform | Innovation | Corporate Strategy |
| Innovative | Innovation | Corporate Strategy |
| Innovator | Innovation | Corporate Strategy |
| Is innovating | Innovation | Corporate Strategy |
| is the future | Innovation | Corporate Strategy |
| new breed | Innovation | Corporate Strategy |
| controls the market | Market Leadership | Corporate Strategy |
| industry leader | Market Leadership | Corporate Strategy |
| leadership position | Market Leadership | Corporate Strategy |
| Leading the market | Market Leadership | Corporate Strategy |
| Market control | Market Leadership | Corporate Strategy |
| Market leader | Market Leadership | Corporate Strategy |
| Market leadership | Market Leadership | Corporate Strategy |
| Market leading | Market Leadership | Corporate Strategy |
| Market share leader | Market Leadership | Corporate Strategy |
| Rising star | Market Leadership | Corporate Strategy |
| has the best technology | Technology Leadership | Corporate Strategy |
| Leading technology | Technology Leadership | Corporate Strategy |
| technology leader | Technology Leadership | Corporate Strategy |
| acquisition strategy | Acquisitions | Corporate Strategy |
| M&A | Acquisitions | Corporate Strategy |
| mergers and acquisitions | Acquisitions | Corporate Strategy |
| Benchmark | Benchmarks | Best Practices |
| best practices | Best Practices | Best Practices |
| thought leader | Thought Leader | Best Practices |

Returning now to FIG. 1, at block 106 the information domain expert may define an expert rule set. The information domain expert may define the expert rule set using the meaning taxonomy and/or unassociated syntactic structures. The expert rule set, when applied to one or more documents, may extract meaning from the documents in the form of expert analysis. For instance, in one embodiment, expert rules may be associated with meaning loaded entities within the meaning taxonomy. As will be discussed later, expert rules that are associated with a meaning loaded entity may cause documents to be associated with that meaning loaded entity. Thus, in some embodiments of the present invention, a document may be associated with a meaning loaded entity by virtue of a non-normalized syntactic structure included in the document and/or by operation of an expert rule.

In another embodiment, the expert rule set may include one or more queries. These queries may identify specific documents as being of interest if a logical proposition, composed of meaning loaded entities and syntactic structures, evaluates to true when applied to the specific documents. The logical proposition may be, for example, a logical implication. The logical proposition may include one or more logical operators. A non-limiting list of the logical operators that may be used in these logical propositions includes "and", "or", "xor" and "andnot." The logical propositions may include other operators as well. For example, in one embodiment comparison operators, such as "<", ">" and "=" may be used. In still another embodiment, a proximity operator may be used that will evaluate as true if a meaning loaded entity or any syntactic structure appears within a configurable proximity from a another meaning loaded entity or syntactic structure. Still another operator may evaluate as true if a particular meaning loaded entity or any syntactic structure appears multiple times within a configurable span of a document.

As a result of these capabilities, the expert rule set may identify as being of interest any document already associated with a particular meaning loaded entity. Moreover, the rule set may identify as being of interest any document not associated with a particular meaning loaded entity, or any document associated with a first meaning loaded entity, but not a specific syntactic structure. In another embodiment, the rule set may identify as being of interest documents associated with two or more meaning loaded entities. In still another embodiment, the rule set may identify as interesting documents associated with two or more meaning loaded entities within a certain proximity of one another. This configurability of the expert rule set gives the information domain expert a variety of tools with which to analyze and categorize documents.

Figure 3:
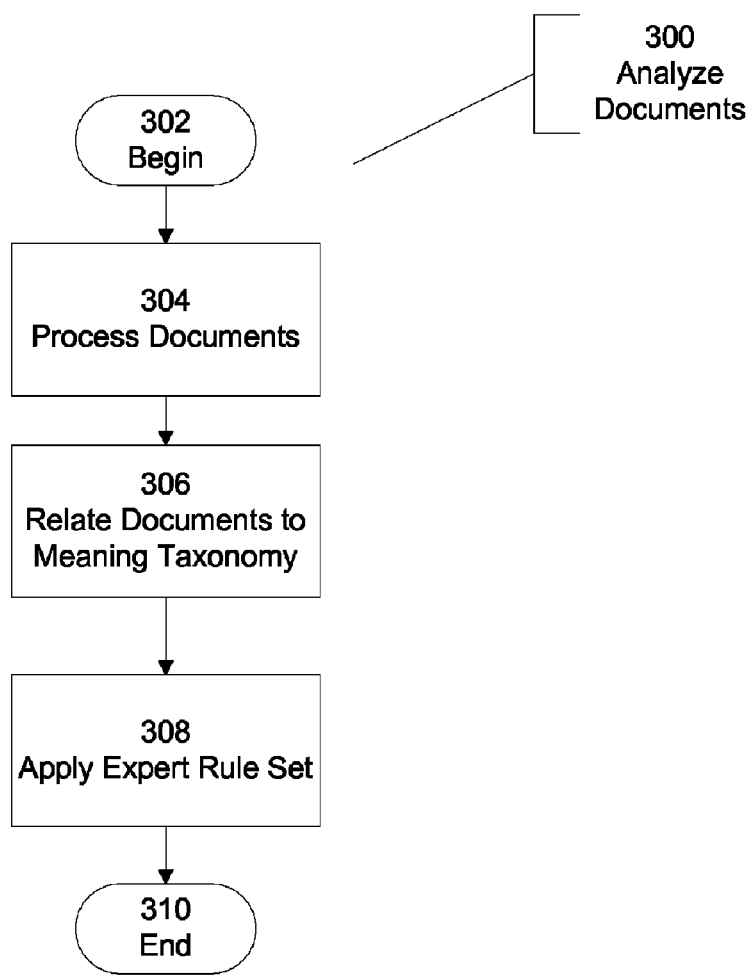
FIG. 3 is a flow chart of a process for analyzing documents according to one embodiment of the present invention.

At block 108, a system uses a meaning taxonomy and expert rule set to analyze one or more documents. FIG. 3 presents a detailed view of one embodiment of this process. At block 302, process 300 begins. At block 304, the system may process the documents to determine and store the syntactic characteristics of each. In one embodiment, the system may search each document for the presence or absence of specific syntactic structures or common variations of the syntactic structures. In another embodiment, the system may produce a comprehensive text analytics database, as known to those of skill in the art.

At block 306, the system may relate the documents to the meaning taxonomy. This relation may be determined using the results of the document processing block 304, including a text analytics database. Documents may be related with specific meaning loaded entities based on the documents inclusion of one or more syntactic structures and/or meaning loaded entities.

At block 308, the system may apply the expert rule set to the documents. In so doing, the system may evaluate one or more logical propositions with regard to the documents. Based on the results of the logical propositions, the system may then record as interesting a subset of the documents. In one embodiment, any documents that are determined as being of interest may be associated with meaning loaded entities within the meaning taxonomy.

At block 310, process 300 ends.

Returning now to FIG. 1, at block 110 the system may provide expert analysis to an external entity. The expert analysis may include a populated meaning taxonomy, the associations of the meaning taxonomy with one or more analyzed documents and the analyzed documents. The external entity may include a user or another system. In one embodiment, the results of the expert analysis are provided to a user of a search engine through a graphical user interface. In another embodiment, the results are provided to another system through a system interface.

At block 112, process 100 ends.

Each of processes 100, 200 and 300 depicts one particular sequence of events in accord with the present invention. Other stages can be added, or the order of stages can be altered in these processes without departing from the spirit of the present invention.

Figure 4:
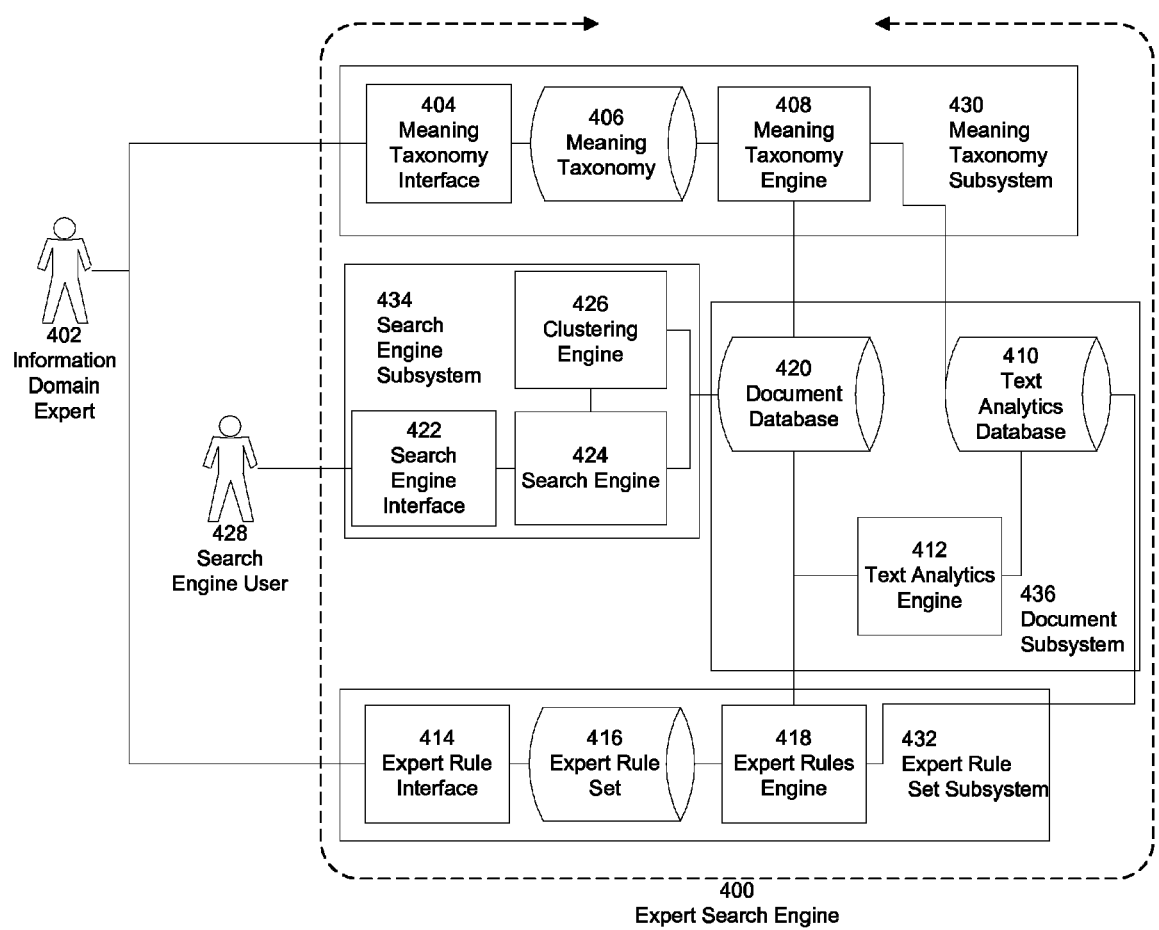
FIG. 4 depicts, in context, a system for providing an expert search engine in accordance with one embodiment of the invention.

A system that may be used to facilitate the processes detailed above. FIG. 4 illustrates a functional block diagram of an expert search engine system 400 according to one embodiment of the invention. Any of the modules recited below may be implemented in customized software code or using existing software including a GUI, email, FTP, batch system interface, database system data movement tools, middleware, search engines such as Fast, Autonomy, Google Search Appliance, and/or Lucene, scanning with optical character recognition (OCR), any combination thereof, or otherwise. Moreover, the modular structure and content recited below is for exemplary purposes only and is not intended to limit the invention to the specific structure shown in FIG. 4. As will be apparent to one of ordinary skill in the art, many variant modular structures can be architected without deviating from the present invention. The particular modular arrangement presented in FIG. 4 was chosen to promote clarity.

The databases 406, 410, 416 and 420 may take the form of any logical construction capable of storing information on a computer readable medium including flat files, indexed files, hierarchical databases, relational databases and/or object oriented databases. The data may be modeled using unique and foreign key relationships and indexes. The unique and foreign key relationships and indexes may be established between the various fields and tables to ensure both data integrity and retrieval speed.

System 400 may include one or more subsystems. One of these subsystems may include a document subsystem 436. The document subsystem 436 may include a text analytics database 410, a text analytics engine 412 and a document database 420. The document database 420 may store and provide documents and document metadata to various consumers, including a meaning taxonomy engine 408, the text analytics engine 412, an expert rules engine 418, a clustering engine 426 and a search engine 424, each of which is discussed further below. The text analytics database 410 may receive text analytics information from the text analytics engine 412 and may provide that information to the meaning taxonomy engine 408 and to the expert rules engine 418. The text analytics engine 412 may receive document information from the document database 420 and may provide text analytics information to the text analytics database 410.

System 400 may also include a meaning taxonomy subsystem 430. The meaning taxonomy subsystem 430 may include a meaning taxonomy interface 404, a meaning taxonomy database 406 and the meaning taxonomy engine 408. The meaning taxonomy interface 404 may receive meaning taxonomy configuration information from, and provide meaning taxonomy configuration information to, a domain expert 402. The meaning taxonomy interface 404 may also provide meaning taxonomy configuration information to the meaning taxonomy database 406. The meaning taxonomy database 406 may store meaning taxonomy configuration information provided from the meaning taxonomy interface 404 and may provide that information to the meaning taxonomy engine 408. The meaning taxonomy engine 408 may receive meaning taxonomy configuration information from the meaning taxonomy database 406 and text analytics information from the text analytics database 410. The meaning taxonomy engine may also provide document association information to the document database 420.

System 400 may further include an expert rule set subsystem 432. The expert rule set subsystem 432 may include an expert rule interface 414, an expert rule set database 416 and the expert rules engine 418. The expert rule interface 414 may receive expert rule set configuration information from, and provide expert rule set configuration information to, the domain expert 402. The expert rule interface 414 may provide expert rule configuration information to the expert rules database 416. The expert rule database 416 may store expert rule set information provided by the expert rule interface 414 and may provide that information to the expert rules engine 418. The expert rules engine 418 may receive expert rule information from the expert rule set database 416 and may provide document association information to the document database 420.

System 400 may still further include a search engine subsystem 434. The search engine subsystem 434 may include a search engine interface 422, the search engine 424 and the clustering engine 426. The search engine interface 422 may receive search criteria from the search engine user 428 and may provide that information to the search engine 424. The search engine interface 422 may also receive search and/or analysis results from the search engine 424 and provide that information to the search engine user 428. The search engine 424 may receive search criteria from the search engine interface 422 and may receive document information from the document database 420. The search engine 424 may also provide instructions to a clustering engine 426 and receive document clustering information from the clustering engine 426. The clustering engine 426 may receive instructions from the search engine 424 and document information from the document database 420 and may provide clustering information to the search engine 424.

Information may flow between these components and subsystems using any technique known in the art. Such techniques include passing the information over the network via TCP/IP, passing the information between modules in memory and passing the information by writing to a file, database, or some other non-volatile storage device.

The meaning taxonomy interface 404, the expert rule interface 414 and the search engine interface 422, each exchange information with various providers and consumers. These providers and consumers may include users and system interfaces. In the exemplary embodiment illustrated in FIG. 4, the information domain expert 402 exchanges information with the meaning taxonomy interface 404 and the expert rule interface 414, while the search engine user 428 exchanges information with the search engine interface 422. In an alternative embodiment, this information may be exchanged with other applications or storage media using system interfaces exposed by each of these components. Each of these components may both restrict input to a predefined set of values and validate any information entered prior to using the information or providing the information to other components.

Figure 6:
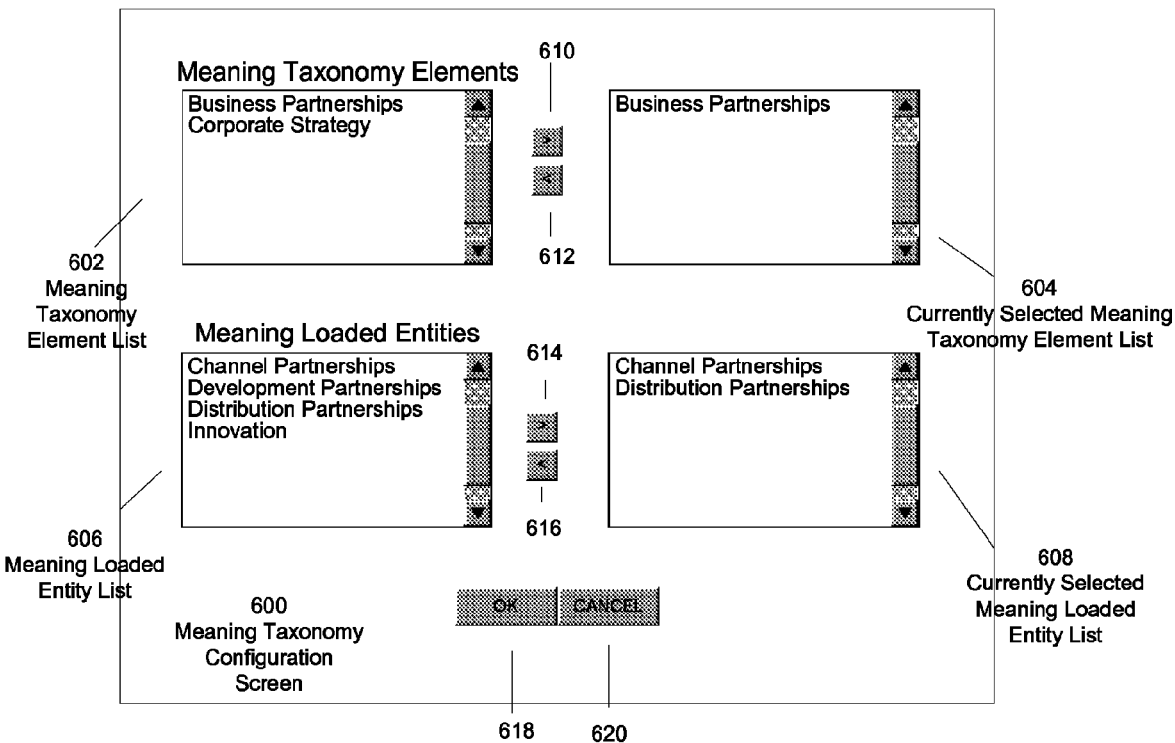
FIG. 6 is an example user interface according to one embodiment of the present invention that may be presented to a user and/or a developer by an expert search engine system to allow the user to define part of a meaning taxonomy.
Figure 7:
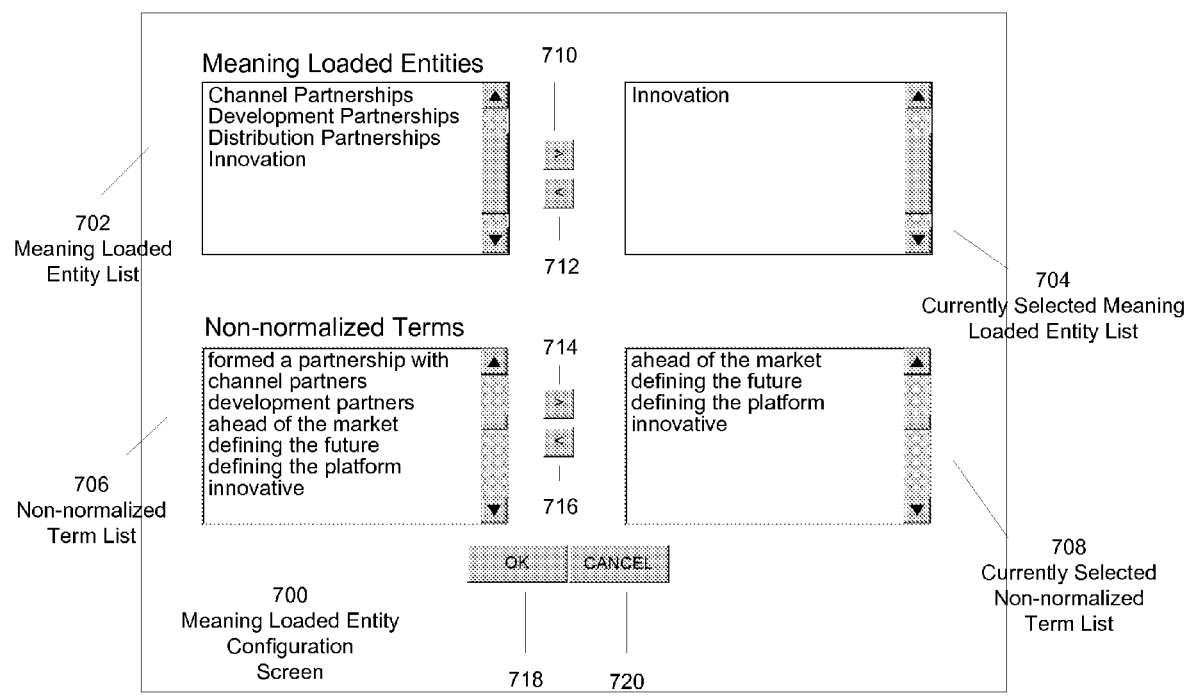
FIG. 7 is an example user interface according to one embodiment of the present invention that may be presented to a user and/or a developer by an expert search engine system to allow the user to define another part of a meaning taxonomy.

Returning to the meaning taxonomy subsystem 430, the meaning taxonomy interface 404 exposes interfaces that receive and provide meaning taxonomy configuration information. FIGS. 6 and 7 depict one exemplary embodiment in which the information domain expert 402 may enter meaning taxonomy configuration information using meaning taxonomy interface 404. FIG. 6 illustrates a meaning taxonomy configuration screen 600 that may include meaning taxonomy element list 602, currently selected meaning taxonomy element list 604, meaning loaded entity list 606, currently selected meaning loaded entity list 608, list selection elements 610-616, an ok button 618 and a cancel button 620.

These user interface elements of the meaning taxonomy configuration screen 600 may function as follows. With combined reference to FIGS. 4 and 6, the information domain expert 402 may enter new meaning taxonomy elements by selecting the meaning taxonomy element list 602 and entering new list entries. Similarly, the information domain expert 402 may enter new meaning loaded entities by selecting the meaning loaded entity list 606 and entering new list entries.

To select a particular meaning taxonomy element with which to associate one or more meaning loaded entities, the information domain expert 402 may select the particular meaning taxonomy element in the meaning taxonomy element list 602 and actuate list selection element 610. When list selection element 610 is actuated, the currently selected meaning taxonomy element in meaning taxonomy element list 602 will be displayed in currently selected meaning taxonomy element list 604 and any meaning loaded entities with which the currently selected meaning taxonomy element is associated will be displayed in currently selected meaning loaded entity list 608.

The information domain expert 402 may associate additional meaning loaded entities with the currently selected meaning taxonomy element by selecting the meaning loaded entities in the meaning loaded entity list 606 and actuating list selection element 614. Alternatively, the information domain expert 402 may disassociate the meaning loaded entity or entities currently selected in the currently selected meaning loaded entity list 608 by actuating list selection element 616.

The information domain expert 402 may unselect the currently selected meaning taxonomy element by actuating list selection element 612. The information domain expert 402 may save his changes by actuating the ok button 618 or may cancel his changes by actuating the cancel button 620.

FIG. 7 illustrates a meaning loaded entity configuration screen 700 that may include meaning loaded entity list 702, currently selected meaning loaded entity list 704, non-normalized term list 706, currently selected non-normalized term list 708, list selection elements 710-716, an ok button 718 and a cancel button 720.

These user interface elements of the meaning loaded entity configuration screen 700 may function as follows. With combined reference to FIGS. 4 and 7, the information domain expert 402 may enter meaning loaded entities by selecting the meaning loaded entity list 702 and entering new list entries. Similarly, the information domain expert 402 may enter new non-normalized terms by selecting the non-normalized term list 706 and entering new list entries.

To select a particular meaning loaded entity with which to associate one or more non-normalized terms, the information domain expert 402 may select the particular meaning loaded entity in the meaning loaded entity list 702 and actuate list selection element 710. When list selection element 710 is actuated, the currently selected meaning loaded entity in meaning loaded entity list 702 will be displayed in currently selected meaning loaded entity list 704 and any non-normalized terms with which the currently selected meaning loaded entity is associated will be displayed in currently selected non-normalized term list 708.

The information domain expert 402 may associate additional non-normalized terms with the currently selected meaning loaded entity by selecting the terms in the non-normalized term list 706 and actuating list selection element 714. Alternatively, the information domain expert 402 may disassociate the non-normalized term or terms currently selected in the currently selected non-normalized term list 708 by actuating list selection element 716.

The information domain expert 402 may unselect the currently selected meaning loaded entity by actuating list selection element 712. The information domain expert 402 may save his changes by actuating the ok button 718 or may cancel his changes by actuating the cancel button 720.

Referring to FIG. 4, the meaning taxonomy database 406 receives, stores, retrieves and provides meaning taxonomy configuration information. In one embodiment, this information is stored in one or more relational database tables. These tables may include storage fields for non-non-normalized syntactic structures, non-normalized syntactic structures and meaning loaded entities as well as storage fields for the association of these components in the meaning taxonomy.

The meaning taxonomy engine 408 may associate documents within the document database 420 with various meaning loaded entities included in meaning taxonomy database 406. The meaning taxonomy engine 408 may use the text analytics included in the text analytics database 410 to identify those documents that include non-normalized syntactic structures and/or normalized syntactic structures. The meaning taxonomy engine may then associate those documents with meaning loaded entities that are themselves associated with the non-normalized and/or normalized syntactic structures. In one embodiment, this association may be accomplished by storing the association metadata within the document database 420. Storing the association thusly may yield performance benefits when retrieving documents according to their relationship to the meaning taxonomy.

Returning to the document subsystem 436, the text analytics database 410 receives, stores, retrieves and provides text analytics information. The text analytics database 410 may contain various summarized characteristics of the documents included in the document database 420. In one embodiment, this information is stored in one or more relational database tables. These tables may include storage fields for various syntactic structures, including non-normalized syntactic structures, as well as the location of the syntactic structures within the documents that include them. In addition to other benefits, keeping a separate text analytics database 410 may increase the performance of the meaning taxonomy engine 408 and the expert rules engine 418.

The text analytics engine 412 may process the documents held within the document database 420 and may load the text analytics database 410. As text analytics engines are well known in the art, the method of operation of such engines will not be repeated in detail in this disclosure.

The document database 420 receives, stores, retrieves and provides document content and metadata. In one embodiment, this information is stored in one or more relational database tables. These tables may include storage fields for the documents and document metadata including association information documents that are associated with one or more meaning loaded entities.

Figure 8:
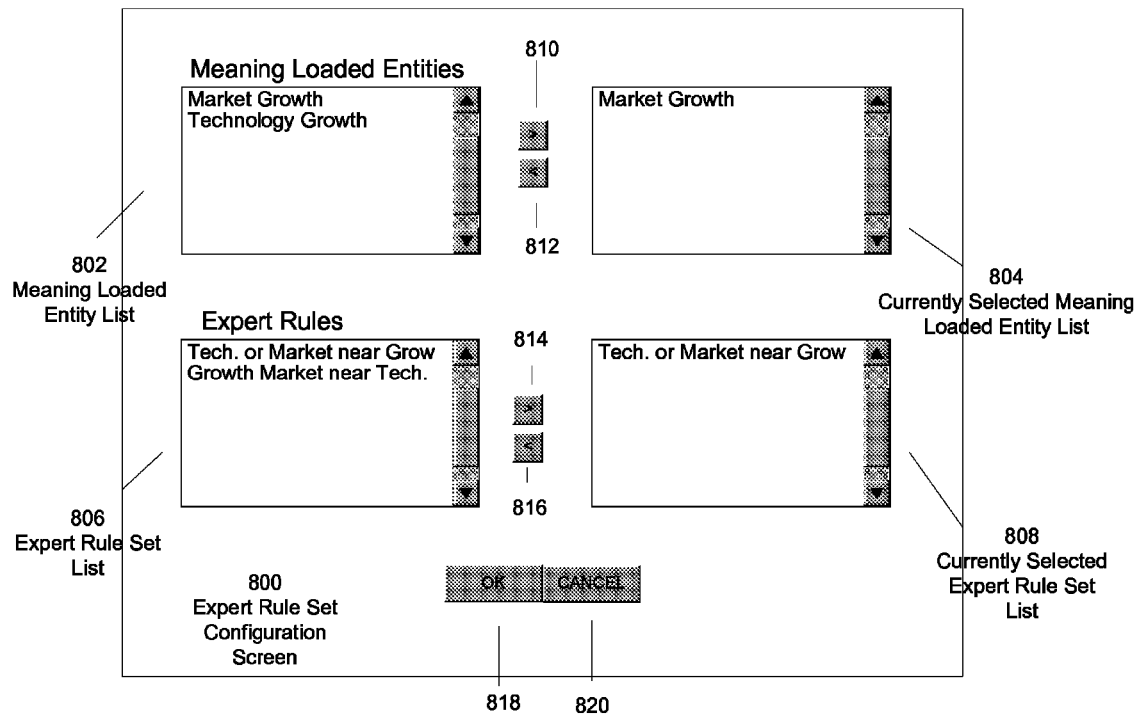
FIG. 8 is an example user interface according to one embodiment of the present invention that may be presented to a user and/or a developer by an expert search engine system to allow the user to define an expert rule set.

Referring to the expert rule subsystem 432, the expert rule interface 414 exposes interfaces that receive and provide expert rule configuration information. FIG. 8 illustrates a expert rule set configuration screen 800 that may include meaning loaded entity list 802, currently selected meaning loaded entity list 804, expert rule set list 806, currently selected expert rule set list 808, list selection elements 810-816, an ok button 818 and a cancel button 820.

These user interface elements of the expert rule set configuration screen 800 may function as follows. With combined reference to FIGS. 4 and 8, the information domain expert 402 may enter new meaning loaded entities by selecting the meaning loaded entity list 802 and entering new list entries. Similarly, the information domain expert 402 may enter new expert rules by selecting the expert rule set list 806 and entering new list entries.

To select a particular meaning loaded entity with which to associate one or more expert rules, the information domain expert 402 may select the particular meaning loaded entity in the meaning loaded entity list 802 and actuate list selection element 810. When list selection element 810 is actuated, the currently selected meaning loaded entity in meaning loaded entity list 802 will be displayed in currently selected meaning loaded entity list 804 and any expert rules with which the currently selected meaning loaded entity is associated will be displayed in currently selected expert rule set list 808.

The information domain expert 402 may associate additional expert rules with the currently selected meaning loaded entity by selecting the terms in the expert rule set list 806 and actuating list selection element 814. Alternatively, the information domain expert 402 may disassociate the expert rule or rules currently selected in the currently selected expert rule set list 808 by actuating list selection element 816.

The information domain expert 402 may unselect the currently selected meaning loaded entity by actuating list selection element 812. The information domain expert 402 may save his changes by actuating the ok button 818 or may cancel his changes by actuating the cancel button 820.

Returning now to FIG. 4, the expert rule set database 416 receives, stores, retrieves and provides expert rule set information. In one embodiment, this information is stored in one or more relational database tables. These tables may include storage fields for the expert rules including any queries and any associated logical propositions.

The expert rules engine 418 identifies documents of interest within the document database 420. In one embodiment, the expert rules engine 418 may receive one or more expert rules from the expert rule set database 416 in the form of queries. These queries may include one or more logical propositions. The expert rules engine 418 may evaluate each logical proposition using information from the text analytics database 410 and/or the document database 420. For example, if a rule includes a logical proposition that evaluates to true if a non-normalized syntactic structure resides within 20 characters of a meaning loaded entity within a document, expert rules engine 418 may access the document database 420 for document and associated meaning loaded entity information and may access the text analytics database 410 to locate the non-normalized syntactic structure's location within various documents.

In another embodiment, expert rules engine 418 may associate documents with meaning loaded entities if a particular logical proposition evaluates to true for those documents. More specifically, if a particular logical proposition is included in an expert rule that is associated with a particular meaning loaded entity and that logical proposition evaluates to true against a particular document, the expert rules engine 418 may associate that particular document with the meaning loaded entity associated with the expert rule.

Referring now to the search engine subsystem 434, the search engine interface 422 exposes interfaces that receive and provide search criteria. In one embodiment, the search engine user 428 enters search engine criteria into a graphical user interface. Using the search criteria provided by the search engine interface 422 and document information provided by the document database 420, the search engine 424 provides the search engine interface with expert analysis results. In one embodiment, these results are clustered by the clustering engine 426 prior to provision to the search engine interface 422. For example, the clustering engine 426 may cluster the search results within the meaning taxonomy, thereby enabling the search engine user 428 to navigate the meaning taxonomy through the search results.

Figure 5:
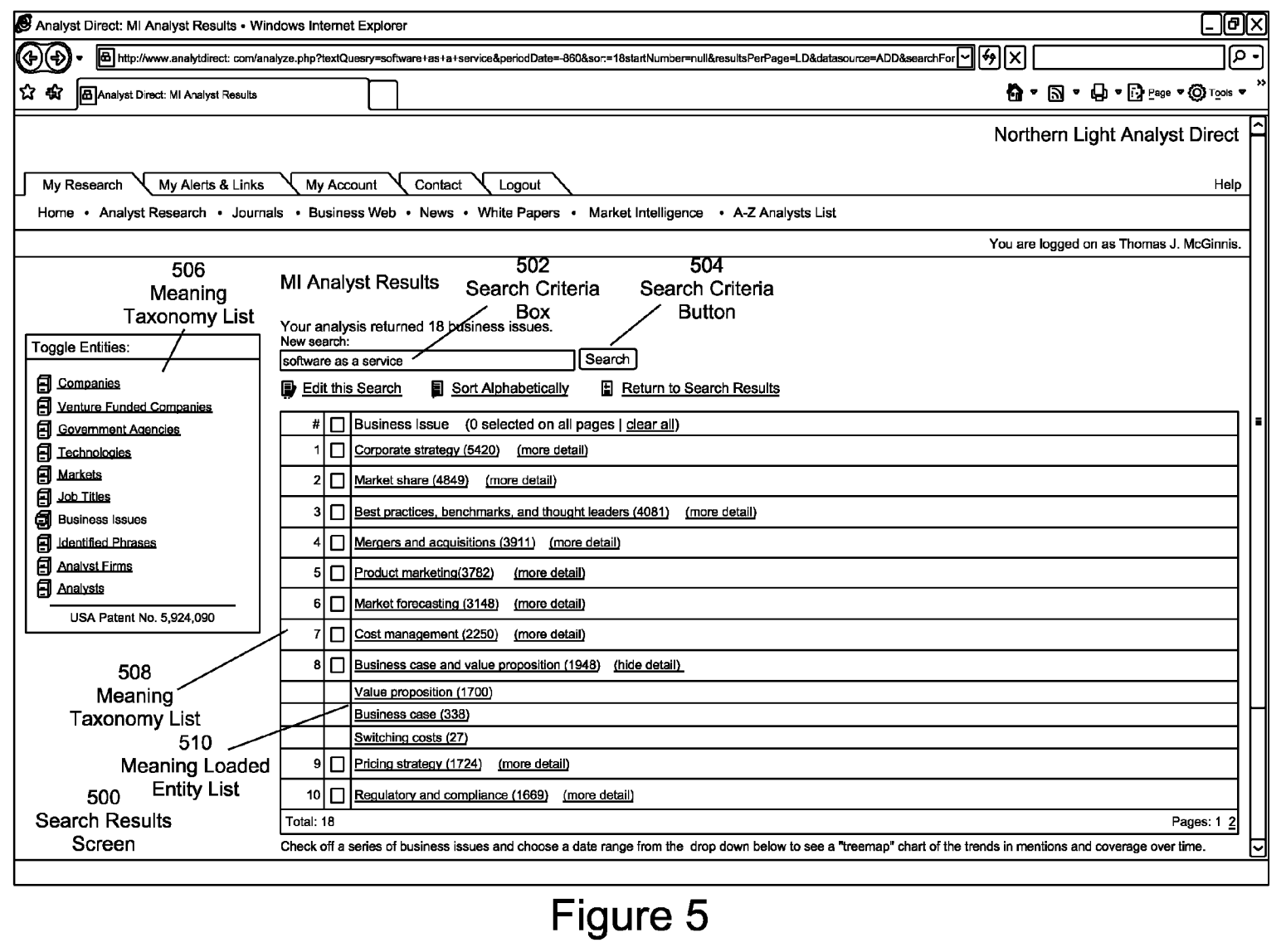

FIG. 5 illustrates a search results screen 500 in accord with the present invention. Search results screen 500 may include search criteria box 502, search criteria button 504, meaning taxonomy lists 506 and 508 and meaning loaded entity list 510.

These user interface elements of the search results screen 500 may function as follows. With combined reference to FIGS. 4 and 5, if the search engine user 428 may conduct a search of the document database 420 by entering search criteria into search criteria box 502 and actuating search criteria button 504. Any meaning loaded entities that are present in the documents matching the search criteria may be displayed by navigating meaning taxonomy lists 506 and 508 and the meaning loaded entity list 510.

In the illustrated embodiment, the search results are clustered by the highest level entities of the meaning taxonomy. These meaning taxonomy elements are listed in the meaning taxonomy list 506. If a search engine user 428 selects one of the meaning taxonomy elements listed in the meaning taxonomy list 506, lower level meaning taxonomy elements associated with the selected meaning taxonomy element are displayed in the meaning taxonomy list 508. Drill down to lower meaning loaded entities may occur if the search engine user 428 selects one of the meaning taxonomy elements listed in meaning taxonomy list 508. Once the lowest level meaning taxonomy element, e.g. a meaning loaded entity, is reached, search results screen 500 may display one or more documents associated with the last meaning taxonomy element selected. In this way, search results screen 500 enables a search engine user 428 to navigate the meaning taxonomy and take advantage of the expert analysis and meaning extraction provided by the meaning taxonomy.

The above defined processes 100, 200 and 300 according to embodiments of the invention, may be implemented on one or more general-purpose computer systems. For example, various aspects of the invention may be implemented as specialized software executing in a general-purpose computer system 400 such as that shown in FIG. 9. Computer system 400 may include one or more output devices 401, one or more input devices 402, a processor 403 connected to one or more memory devices 404 through an interconnection mechanism 405 and one or more storage devices 406 connected to interconnection mechanism 405. Output devices 401 typically render information for external presentation and examples include a monitor and a printer. Input devices 402 typically accept information from external sources and examples include a keyboard and a mouse. Processor 403 typically performs a series of instructions resulting in data manipulation. Processor 403 is typically a commercially available processor such as an Intel Pentium, Motorola PowerPC, SGI MIPS, Sun UltraSPARC, or Hewlett-Packard PA-RISC processor, but may be any type of processor. Memory devices 404, such as a disk drive, memory, or other device for storing data is typically used for storing programs and data during operation of the computer system 400. Devices in computer system 400 may be coupled by at least one interconnection mechanism 405, which may include, for example, one or more communication elements (e.g., busses) that communicate data within system 400.

Figure 10:
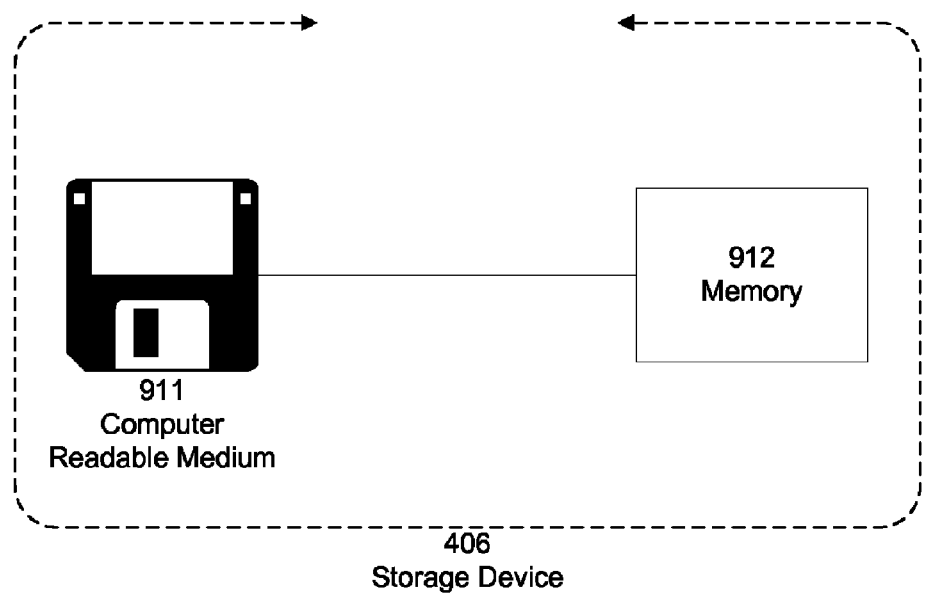
FIG. 10 illustrates a storage device of a general-purpose computer system suitable for implementing various embodiments of the present invention.

The storage device 406, shown in greater detail in FIG. 10, typically includes a computer readable and writeable nonvolatile recording medium 911 in which signals are stored that define a program to be executed by the processor or information stored on or in the medium 911 to be processed by the program. The medium may, for example, be a disk or flash memory. Typically, in operation, the processor causes data to be read from the nonvolatile recording medium 911 into another memory 912 that allows for faster access to the information by the processor than does the medium 911. This memory 912 is typically a volatile, random access memory such as a dynamic random access memory (DRAM), static memory (SRAM). Memory 912 may be located in storage device 406, as shown, or in memory device 404. The processor 403 generally manipulates the data within the memory 404, 912 and then copies the data to the medium 911 after processing is completed. A variety of mechanisms are known for managing data movement between the medium 911 and the memory 404, 912, and the invention is not limited thereto. The invention is not limited to a particular memory device 404 or storage device 406.

Computer system 400 may be implemented using specially programmed, special purpose hardware, or may be a general-purpose computer system that is programmable using a high-level computer programming language. For example, computer system 400 may include cellular phones, personal digital assistants and/or other types of mobile computing devices. Computer system 400 usually executes an operating system which may be, for example, the Windows 95, Windows 98, Windows NT, Windows 2000, Windows ME, Windows XP, Windows Vista or other operating systems available from the Microsoft Corporation, MAC OS System X available from Apple Computer, the Solaris Operating System available from Sun Microsystems, or UNIX operating systems available from various sources (e.g., Linux). Many other operating systems may be used, and the invention is not limited to any particular implementation. For example, an embodiment of the present invention may build a text analytics database using a general-purpose computer system with a Sun UltraSPARC processor running the Solaris operating system.

Figure 9:
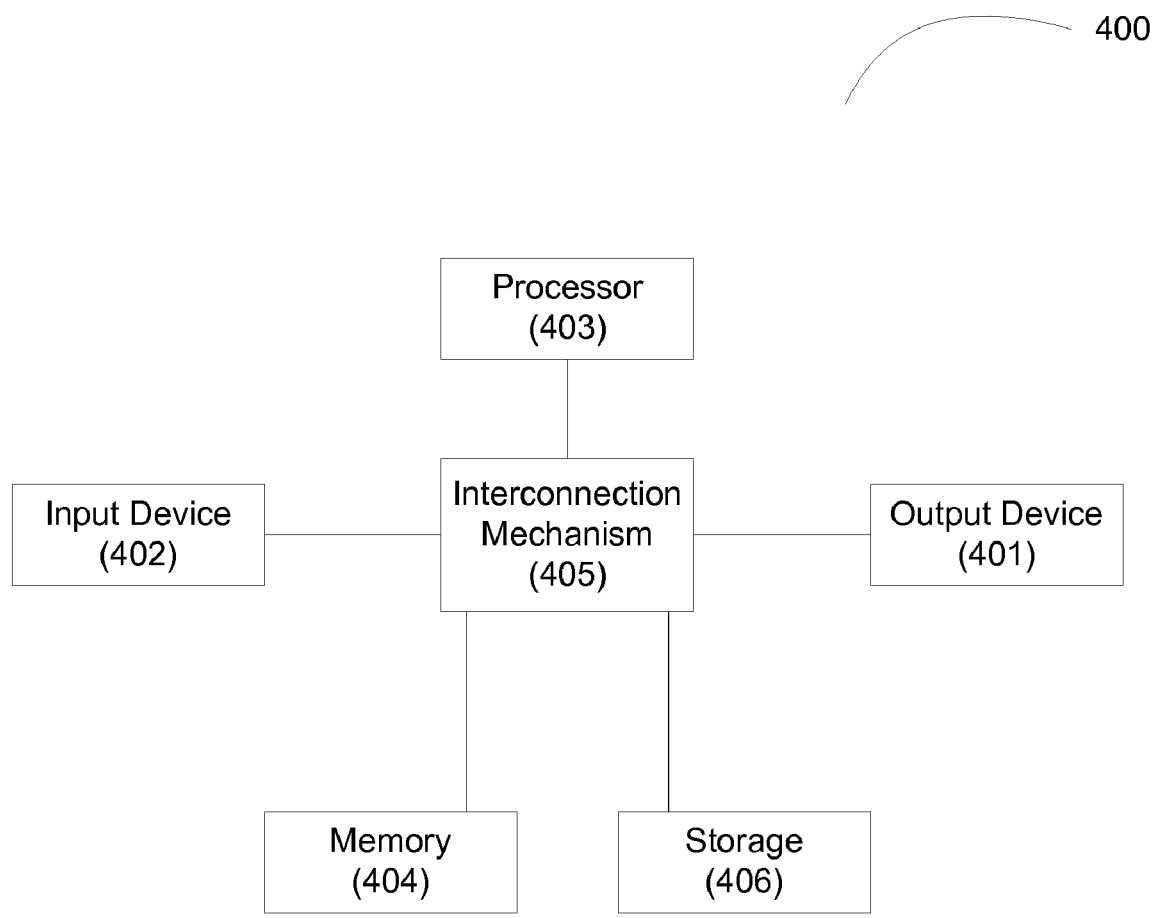
FIG. 9 shows a general-purpose computer system upon which various embodiments of the present invention may be practiced.

Although computer system 400 is shown by way of example as one type of computer system upon which various aspects of the invention may be practiced, it should be appreciated that the invention is not limited to being implemented on the computer system as shown in FIG. 9. Various aspects of the invention may be practiced on one or more computers having a different architecture or components than that shown in FIG. 9. To illustrate, one embodiment of the present invention may receive search criteria using several general-purpose computer systems running MAC OS System X with Motorola PowerPC processors and several specialized computer systems running proprietary hardware and operating systems.

Figure 11:
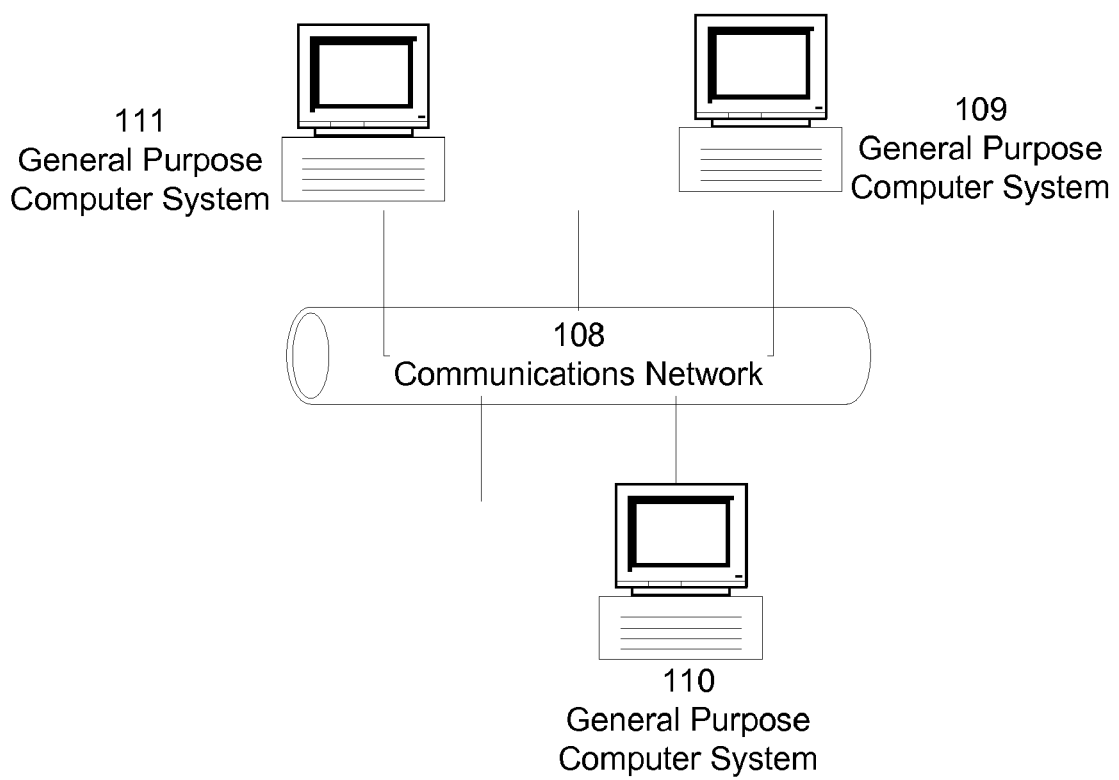
FIG. 11 depicts a network of general-purpose computer systems in which various embodiments of the present invention may be practiced.

As depicted in FIG. 11, one or more portions of the system may be distributed to one or more computers (e.g., systems 109-111) coupled to communications network 108. These computer systems 109-111 may also be general-purpose computer systems. For example, various aspects of the invention may be distributed among one or more computer systems configured to provide a service (e.g., servers) to one or more client computers, or to perform an overall task as part of a distributed system. More particularly, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). To illustrate, one embodiment may expert search engine results though a browser interpreting HTML forms and may store document information in a document database using a data translation service running on a separate server.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. For example, a meaning taxonomy user interface may be implemented using a Microsoft Excel spreadsheet while the application designed to tagged documents associated with meaning loaded entities may be written in C++.

It should be appreciated that a general-purpose computer system in accord with the present invention may perform functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of UPPSALA, Sweden and WebSphere middleware from IBM of Armonk, N.Y. If SQL Server is installed on a general-purpose computer system to implement an embodiment of the present invention, the same general-purpose computer system may be able to support databases for sundry applications.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having now described some illustrative aspects of the invention, it should be apparent to those skilled in the art that the foregoing is merely illustrative and not limiting, having been presented by way of example only. While the bulk of this disclosure is focused on embodiments directed to business management, aspects of the present invention may be applied to other information domains, for instance law and scientific disciplines. Similarly, aspects of the present invention may be used to achieve other objectives including assisting other types of users, such as domain information experts, in their analysis of specific information domains. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A computer-implemented method for extracting meaning from a plurality of documents, the method comprising:
   identifying, by a computer, a meaning taxonomy including a plurality of concepts;
   identifying a plurality of meaning loaded entities within the meaning taxonomy;
   identifying a group of syntactic structures including at least one normalized syntactic structure and a plurality of non-normalized syntactic structures, the at least one normalized syntactic structure being used to standardize the plurality of non-normalized syntactic structures;

associating the at least one normalized syntactic structure with at least one of the plurality of concepts;

associating at least one of the plurality of non-normalized syntactic structures with the at least one normalized syntactic structure; and associating at least one of the plurality of documents with the at least one of the plurality of concepts based on a relationship between the at least one of the plurality of documents and the at least one of the plurality of non-normalized syntactic structures.

2. The method according to claim 1, wherein identifying the group of syntactic structures comprises identifying a word.

3. The method according to claim 1, wherein identifying the group of syntactic structures comprises identifying a phrase.

4. The method according to claim 1, wherein identifying the group of syntactic structures comprises identifying a sentence.

5. The method according to claim 1, wherein associating the at least one normalized syntactic structure comprises associating a plurality of normalized syntactic structures with the at least one of the plurality of concepts.

6. The method according to claim 1, wherein associating the at least one of the plurality of non-normalized syntactic structures comprises associating a two or more non-normalized syntactic structures of the plurality of non-normalized syntactic structures with the at least one normalized syntactic structure based on a relative proximity of the two or more non-normalized syntactic structures to each other.

7. The method according to claim 1, wherein associating the at least one of the plurality of documents comprises associating the at least one of the plurality of documents with the at least one of the plurality of concepts when the at least one of the plurality of documents includes at least one of the plurality of non-normalized syntactic structures that is associated with the at least one normalized syntactic structure.

8. The method according to claim 1, wherein associating the at least one of the plurality of documents comprises associating the at least one of the plurality of documents with the at least one of the plurality of concepts when the at least one of the plurality of documents includes none of the at least one of the plurality of non-normalized syntactic structures that is associated with the at least one normalized syntactic structure.

9. The computer-implemented method according to claim 1, further comprising:
executing a search against the plurality of documents, the search resulting in a subset of the plurality of documents; and
providing the subset of the plurality of documents to an external entity, the subset of the plurality of documents grouped by at least one concept of the plurality of concepts that is associated with at least one of the subset of the plurality of documents.

10. A non-transitory computer readable medium having computer readable signals stored thereon that define instructions that, as a result of being executed by a computer, instruct the computer to perform a method for extracting meaning from a plurality of documents, the method comprising:
identifying a meaning taxonomy including a plurality of concepts;
identifying a plurality of meaning loaded entities within the meaning taxonomy;
identifying a group of syntactic structures including at least one normalized syntactic structure and a plurality of non-normalized syntactic structures, the at least one normalized syntactic structure being used to standardize the plurality of non-normalized syntactic structures;
associating the at least one normalized syntactic structure with at least one of the plurality of concepts;
associating at least one of the plurality of non-normalized syntactic structures with the at least one normalized syntactic structure; and
associating at least one of the plurality of documents with the at least one of the plurality of concepts based a relationship between the at least one of the plurality of documents and the at least one of the plurality of non-normalized syntactic structures.

11. A computer-implemented method for configuring a meaning taxonomy including a plurality of concepts, the method comprising:
providing, to the user in a display, an input component that allows the user to provide at least one non-normalized syntactic structure, the at least one non-normalized syntactic structure being associated with at least one normalized syntactic structure used to standardize non-normalized syntactic structures, the at least one normalized syntactic structure being associated with at least one of the plurality of concepts;
receiving, from the user, the at least one non-normalized syntactic structure;
providing, to the user in the display, an input component that allows the user to associate the at least one non-normalized syntactic structure with at least one meaning loaded entity; and
receiving, from the user, the association between the at least one non-normalized syntactic structure and the at least one meaning loaded entity.

12. The method according to claim 11, wherein providing, to the user in the display, an input component that allows the user to provide at least one non-normalized syntactic structure comprises providing, to the user in the display, an input component that allows the user to enter a word.

13. The method according to claim 11, wherein providing, to the user in the display, an input component that allows the user to provide at least one non-normalized syntactic structure comprises providing, to the user in the display, an input component that allows the user to enter a phrase.

14. The method according to claim 11, wherein providing, to the user in the display, an input component that allows the user to provide at least one non-normalized syntactic structure comprises providing, to the user in the display, an input component that allows the user to enter a sentence.

15. The method according to claim 11, further comprising
providing, to the user in the display, an input component that allows the user to provide at least one meaning taxonomy element;
receiving, from the user, the at least one meaning taxonomy element;
providing, to the user in the display, an input component that allows the user to associate the at least one meaning taxonomy element with the at least one meaning loaded entity; and
receiving, from the user, the association between the at least one meaning taxonomy element and the at least one meaning loaded entity.

* * * * *

UNITED STATES PATENT AND TRADEMARK OFFICE
CERTIFICATE OF CORRECTION

| | | Page 1 of 1 |
|---|---|---|
| PATENT NO. | : 7,877,344 B2 | |
| APPLICATION NO. | : 11/870201 | |
| DATED | : January 25, 2011 | |
| INVENTOR(S) | : C. David Seuss | |

It is certified that error appears in the above-identified patent and that said Letters Patent is hereby corrected as shown below:

Cover Page, item (75), please delete "Charles D. Seuss" and replace with "C. David Seuss."

Signed and Sealed this

Twenty-sixth Day of April, 2011

David J. Kappos
*Director of the United States Patent and Trademark Office*